United States Patent
Dai et al.

(10) Patent No.: US 12,484,107 B2
(45) Date of Patent: Nov. 25, 2025

(54) METHODS AND APPARATUSES FOR SMALL DATA TRANSMISSION

(71) Applicant: Lenovo (Beijing) Limited, Beijing (CN)

(72) Inventors: Mingzeng Dai, Shanghai (CN); Ran Yue, Beijing (CN); Jie Shi, Beijing (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 422 days.

(21) Appl. No.: 18/031,711

(22) PCT Filed: Oct. 15, 2020

(86) PCT No.: PCT/CN2020/121159
§ 371 (c)(1),
(2) Date: Apr. 13, 2023

(87) PCT Pub. No.: WO2022/077338
PCT Pub. Date: Apr. 21, 2022

(65) Prior Publication Data
US 2023/0397286 A1 Dec. 7, 2023

(51) Int. Cl.
*H04W 76/27* (2018.01)
*H04W 72/231* (2023.01)

(52) U.S. Cl.
CPC ......... *H04W 76/27* (2018.02); *H04W 72/231* (2023.01)

(58) Field of Classification Search
CPC .... H04W 76/27; H04W 72/231; H04W 76/25
See application file for complete search history.

(56) References Cited

U.S. PATENT DOCUMENTS

2020/0229130 A1 7/2020 Keating et al.
2020/0389867 A1* 12/2020 Zeng ..................... H04W 76/30

FOREIGN PATENT DOCUMENTS

CN 110139386 A * 8/2019 ............ H04W 76/27
WO 2018084762 A1 5/2018

OTHER PUBLICATIONS

Machine translated to English version of CN 110139386 A (Year: 2019).*

(Continued)

*Primary Examiner* — Charles C Jiang
*Assistant Examiner* — Rachel Elizabeth Marks
(74) *Attorney, Agent, or Firm* — FIG. 1 Patents

(57) ABSTRACT

Disclosed are methods for a random access. One embodiment of the subject application provides a method performed by a gNB, including determining a user equipment (UE) to enter an RRC_INACTIVE state by a gNB central unit (gNB-CU), sending a UE context suspension indication and a UE identification (ID) of small data transmission (SDT) to at least one first gNB distributed unit (gNB-DU) by the gNB-CU, storing the UE ID of SDT and keeping a UE context of SDT by the at least one first gNB-DU, and treating the UE in the RRC_INACTIVE state and forwarding a radio resource control (RRC) release manage to the UE by the at least one first gNB-DU, wherein the UE context suspension indication is for indicating the at least one first gNB-DU to keep a the UE context of SDT in the RRC_INACTIVE state, and the UE ID of SDT is for identifying the UE context of SDT. Related apparatuses are also disclosed.

20 Claims, 14 Drawing Sheets

(56) References Cited

OTHER PUBLICATIONS

Ericsson, "Baseline solution for small data transmission in RRC_Inactive", 3GPP TSG-RAN WG2 #96, R2-168713, Reno, Nevada [retrieved May 21, 2023]. Retrieved from the Internet <https://www.3gpp.org/ftp/tsg_ran/WG2_RL2/TSGR2_96/Docs>., Nov. 2016, 7 Pages.

Ericsson, "Small data: comparison between solutions A and B", 3GPP TSG-RAN WG2 #97, R2-1700888, Athens, Greece [retrieved May 21, 2023]. Retrieved from the Internet <https://www.3gpp.org/ftp/TSG_RAN/WG2_RL2/TSGR2_97/Docs>., Feb. 2017, 7 Pages.

Intel, "Radio bearer configuration for SDT considering UE context relocation and CU/DU split", 3GPP TSG RAN WG2 Meeting #111-e, R2-2006714, Electronic meeting [retrieved May 21, 2023]. Retrieved from the Internet <https://www.3gpp.org/ftp/tsg_ran/WG2_RL2/TSGR2_111-e/Docs>., Aug. 2020, 6 Pages.

PCT/CN2020/121159, "International Preliminary Report on Patentability", PCT Application No. PCT/CN2020/121159, Apr. 27, 2023, 7 pages.

PCT/CN2020/121159, "International Search Report and Written Opinion", PCT Application No. PCT/CN2020/121159, Jul. 21, 2021, 10 pages.

\* cited by examiner

METHODS AND APPARATUSES FOR SMALL DATA TRANSMISSION

TECHNICAL FIELD

The present disclosure relates to methods and apparatuses for small data transmission (SDT).

BACKGROUND OF THE INVENTION

In 3GPP (3$^{rd}$ Generation Partnership Project), until Release 16, the RRC_INACTIVE state of a user equipment (UE) doesn't support data transmission. Hence, the UE has to resume the connection (i.e. switch to the RRC_CONNECTED state) for any downlink (DL) data transmission and uplink (UL) data transmission. That is to say, even if the data volume is small and the data transmission is not frequent, the UE still need to be switched to the RRC_CONNECTED state and then switched back to the RRC_INACTIVE state for each data transmission. This results in unnecessary power consumption and signaling overhead.

SUMMARY

In some embodiments, a method performed by a gNB includes determining a UE to enter an RRC_INACTIVE state by a gNB-CU, sending a UE context suspension indication and a UE identification (ID) of SDT to at least one first gNB-DU by the gNB-CU, storing the UE ID of SDT and keeping a UE context of SDT by the at least one first gNB-DU, and treating the UE in the RRC_INACTIVE state and forwarding an RRC release manage to the UE by the at least one first gNB-DU, wherein the UE context suspension indication is for indicating the at least one first gNB-DU to keep the UE context of SDT in the RRC_INACTIVE state, and the UE ID of SDT is for identifying the UE context of SDT.

In some embodiments, the UE context suspension indication is a UE bearer context suspension indication for indicating the at least one first gNB-DU to keep the bearer context related to SDT.

In some embodiments, determining the UE to enter the RRC_INACTIVE state by the gNB-CU further includes determining the UE to perform SDT in the RRC_INACTIVE state by the gNB-CU based on UE capability, a quality of service (QoS) requirement of at least one protocol data unit (PDU) session, or an indication of possibility of SDT.

In some embodiments, the indication of possibility of SDT is from the UE or a core network.

In some embodiments, the method may further include sending an RRC container to the at least one first gNB-DU by the gNB-CU.

In some embodiments, the UE ID of SDT is an inactive-radio network temporary identifier (I-RNTI), a short I-RNTI, or a UE contention resolution identity, or the UE ID of SDT is a dedicated ID created for SDT.

In some embodiments, if the UE ID of SDT is the UE contention resolution identity, the UE ID of SDT contains a first 48 bits of an UL common control channel (CCCH) service data unit (SDU) if the UL CCCH SDU is longer than 48 bits.

In some embodiments, the method may further include, when receiving a message including a small data from the UE by the at least one gNB-DU, identifying the UE context of SDT via the UE ID of SDT and identifying a logical channel identifier (LCID) of the small data via the UE context of SDT by the at least one gNB-DU, sending the small data to the gNB-CU via a general packet radio service (GPRS) tunneling protocol (GTP) user plane (GTP-U) tunnel by the at least one first gNB-DU based on a mapping between the LCID and GTP-U transport network layer (TNL) info by the at least one first gNB-DU, and performing deciphering and/or integrity detection using updated security information by the gNB-CU.

In some embodiments, the message is a Msg A of a 2-step random access (RA) or a Msg 3 of a 4-step RA.

In some embodiments, identifying the UE context of SDT via the UE ID of SDT further includes identifying the UE context of SDT via matching a CCCH SDU with the UE ID of SDT by the gNB-CU in response to that the UE ID of SDT is the UE contention resolution identity, or matching an I-RNTI or a short I-RNTI contained in the RRC message with the UE ID of SDT by the at least one first gNB-DU in response to that the UE ID of SDT is an I-RNTI or a short I-RNTI.

In some embodiments, the method may further include sending the UE ID of SDT to the UE by the gNB-CU, wherein the UE ID of SDT is stored by the UE and is sent by the UE to the at least one first gNB-DU in a MAC control element (CE) for SDT; when receiving a message including a small data from the UE by the at least one gNB-DU, identifying the UE context of SDT via matching the UE ID of SDT in the MAC CE sent by the UE with the UE ID of SDT stored in the at least one gNB-DU by the at least one first gNB-DU; identifying a LCID via the UE context of SDT and sending the small data to the gNB-CU via a GTP-U tunnel based on a mapping between the LCID and GTP-U TNL info by the at least one first gNB-DU, and performing deciphering and/or integrity detection using updated security information by the gNB-CU.

In some embodiments, the UE ID of SDT is assigned by the gNB-CU.

In some embodiments, the UE context of SDT includes at least one of a F1 User plane interface (F1-U) GTP-U tunnel TNL info, a bearer configuration for SDT.

In some embodiments, the UE context suspension indication and the UE ID of SDT are included in a F1 application protocol (F1-AP) message.

In some embodiments, the method may further include sending a SDT indication and security information to at least one gNB-CU user plane (gNB-CU-UP) by a gNB-CU control plane (gNB-CU-CP).

In some embodiments, the SDT indication indicates a possibility of SDT during the UE being in the RRC_INACTIVE state; and the security information is for small data ciphering and/or deciphering by the gNB-CU-UP, or for small data integrity protection and/or integrity detection by the gNB-CU-UP.

In some embodiments, the method further may include receiving a small data from the UE by a second gNB-DU, sending a UE context of SDT required indication to the gNB-CU by the second gNB-DU, sending the UE context of SDT to the second gNB-DU by the gNB-CU, identifying the LCID via the UE context of SDT and sending the small data to the gNB-CU via a GTP-U tunnel based on a mapping between the LCID and GTP-U TNL info by the second gNB-DU, and performing deciphering and/or integrity detection using updated security information by the gNB-CU.

In some embodiments, a method performed by a gNB includes receiving a message including a small data, and a data volume indication (DVI) from a UE by a gNB-DU, determining the UE not to enter an RRC_CONNECTED state according to the DVI by the gNB-DU, sending a UE context retrieval request message and/or a LCID of small data to a gNB-CU, and indicating that the UE is not required to enter the RRC_CONNECTED state by the gNB-DU, providing a UE context of SDT to the gNB-DU by the gNB-CU, and forwarding the small data to the gNB-CU using the UE context of SDT by the gNB-DU.

In some embodiments, the DVI is in a MAC CE.

In some embodiments, the DVI is for indicating a data volume for SDT, or the DVI corresponds to a 2-bit access stratum release assistance indication.

In some embodiments, the message is a Msg A of a 2-step RA or a Msg 3 of a 4-step RA.

In some embodiments, the method may further include starting a timer by the gNB-DU, and releasing the UE context of SDT when the timer being expiring by the gNB-DU.

In some embodiments, a method performed by a gNB includes receiving a message including a small data, and a DVI from a UE by a gNB-DU, abstracting the DVI and generating a DVI in F1-AP by the gNB-DU, sending the DVI in F1-AP, and/or a LCID of small data to a first gNB-CU by the gNB-DU, determining the UE to not enter an RRC_CONNECTED state according to the DVI in F1-AP and providing the UE context of SDT to the gNB-DU by the first gNB-CU, and forwarding the small data to the first gNB-CU using the UE context of SDT by the gNB-DU.

In some embodiments, determining the UE not to enter an RRC_CONNECTED state according to the DVI in F1-AP and providing the UE context of SDT to the gNB-DU by the first gNB-CU further include identifying a UE context of SDT by the first gNB-CU In some embodiments, determining the UE not to enter the RRC_CONNECTED state according to the DVI in F1-AP and providing a UE context of SDT to the gNB-DU by the first gNB-CU further include resolving a second gNB-CU contained in an I-RNTI of the RRC message by the first gNB-CU, providing the DVI in F1-AP and the LCID of small data to the second gNB-CU by the first gNB-CU, requesting the second gNB-CU to providing the UE context by the first gNB-CU, identifying the UE context of SDT by the second gNB-CU, determining the UE not to enter the RRC_CONNECTED state and providing the UE context of SDT to the first gNB-CU by the second gNB-CU, and forwarding the UE context of SDT to the gNB-DU by the first gNB-CU.

In some embodiments, the DVI is in a MAC CE.

In some embodiments, the DVI is for indicating a data volume for SDT, or the DVI corresponds to a 2-bit access stratum release assistance indication.

In some embodiments, the message is a Msg A of a 2-step RA or a Msg 3 of a 4-step RA.

In some embodiments, the method may further include starting a timer by the gNB-DU, and releasing the UE context of SDT when the timer being expiring by the gNB-DU.

In some embodiments, an apparatus includes a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method performed by a gNB. The method includes determining a UE to enter an RRC_INACTIVE state by a gNB-CU, sending a UE context suspension indication and a UE ID of SDT to at least one first gNB-DU by the gNB-CU, storing the UE ID of SDT and keeping a UE context of SDT by the at least one first gNB-DU, and treating the UE in the RRC_INACTIVE state and forwarding a radio resource control (RRC) release manage to the UE by the at least one first gNB-DU, wherein the UE context suspension indication is for indicating the at least one first gNB-DU to keep a UE context of SDT in the RRC_INACTIVE state, and the UE ID of SDT is for identifying the UE context of SDT.

In some embodiments, an apparatus includes a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method performed by a gNB. The method includes receiving a message including a small data, and a DVI from a UE by a gNB-DU, determining the UE not to enter an RRC_CONNECTED state according to the DVI by the gNB-DU, sending a UE context retrieval request message and/or a LCID of small data to a gNB-CU, and indicating that the UE is not required to enter the RRC_CONNECTED state by the gNB-DU, providing a UE context of SDT to the gNB-DU by the gNB-CU, and forwarding the small data to the gNB-CU using the UE context of SDT by the gNB-DU.

In some embodiments, an apparatus includes a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method performed by a gNB. The method includes receiving a message including a small data, and a DVI from a UE by a gNB-DU, abstracting the DVI and generating a DVI in F1-AP by the gNB-DU, sending the DVI in F1-AP, and/or a LCID of small data to a first gNB-CU by the gNB-DU, determining the UE to not enter an RRC_CONNECTED state according to the DVI in F1-AP and providing the UE Context of SDT to the gNB-DU by the first gNB-CU, and forwarding the small data to the first gNB-CU using the UE context of SDT by the gNB-DU.

BRIEF DESCRIPTION OF THE DRAWINGS

Some embodiments will now be described, by way of non-limiting examples, with reference to the accompanying drawings.

DETAILED DESCRIPTION

The detailed description of the appended drawings is intended as a description of the preferred embodiments of the present invention, and is not intended to represent the only form in which the present invention may be practiced. It should be understood that the same or equivalent functions may be accomplished by different embodiments that are intended to be encompassed within the spirit and scope of the present invention.

Reference will now be made in detail to some embodiments of the present application, examples of which are illustrated in the accompanying drawings. To facilitate understanding, embodiments are provided under specific network architecture and new service scenarios, such as 3GPP 5G and so on. It is contemplated that along with developments of network architectures and new service scenarios, all embodiments in the present application are also applicable to similar technical problems, and moreover, the terminologies recited in the present application may change, which should not affect the principle of the present application.

Figure 1:
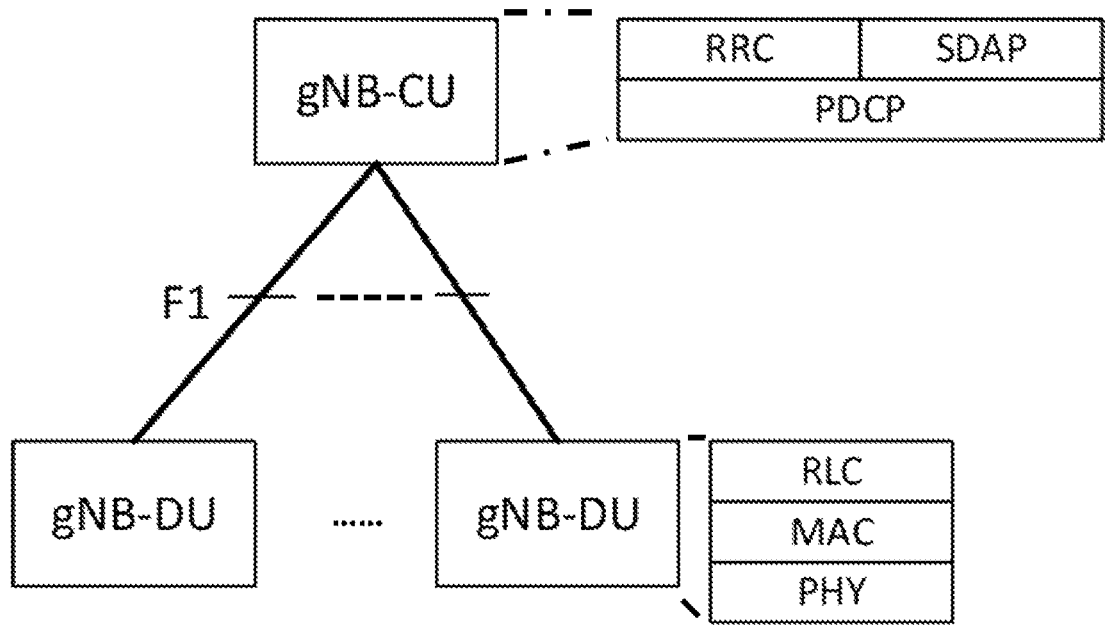
FIG. 1 illustrates an exemplary gNB.

A gNB may consist of two parts: a gNB central unit (gNB-CU) and at least one gNB distributed unit (gNB-DU), please refer to FIG. 1. These two parts are connected by an interface called F1. The radio resource control (RRC) layer, the service data adaptation protocol (SDAP) layer, and the packet data convergence protocol (PDCP) layer are in the gNB-CU and each of the at least one gNB-DU holds the functionality of the radio link control (RLC) layer, the medium access control (MAC) layer, and the physical (PHY) layer.

In the prior art, when the UE moves to the RRC_INACTIVE state, the gNB-DU releases the stored UE context of the UE and the corresponding tunnels/bearer established between the gNB-DU and the gNB-CU. The gNB-CU retrievals the UE context only when the UE moves to RRC_CONNECTED.

The present disclosure generally relates to SDT, especially relates to SDT between a gNB-CU and a gNB-DU when receiving a small data from a UE by the gNB-DU.

In the present disclosure, SDT is enabled when a UE is in the RRC_INACTIVE state; that is to say, when the UE is in the RRC_INACTIVE state, the UE may send multiple UL and DL packets as part of the same SDT mechanism and without transitioning to the RRC_CONNECTED state on dedicated grant. The UE may perform SDT when it is in the RRC_INACTIVE state or in the RRC_CONNECTED state.

Figure 2:
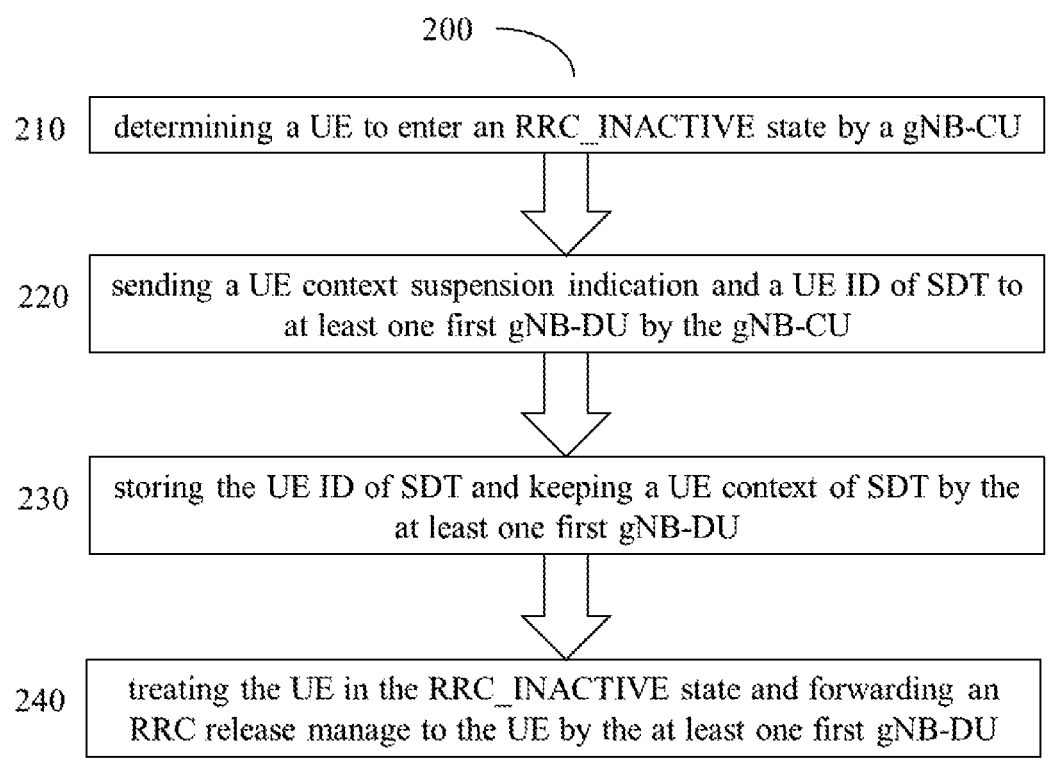
FIG. 2 illustrates an exemplary method for SDT, in accordance with some embodiments of the present disclosure.

FIG. 2 illustrates an exemplary method 200 for SDT performed by a gNB according to some embodiments of the present disclosure.

As shown in FIG. 2, the method 200 may at least include an operation 210 of determining a UE to enter an RRC_INACTIVE state by a gNB-CU, an operation 220 of sending a UE context suspension indication and a UE ID of SDT to at least one first gNB-DU by the gNB-CU, an operation 230 of storing the UE ID of SDT and keeping (i.e., not releasing) a UE context of SDT by the at least one first gNB-DU, and an operation 240 of treating the UE in the RRC_INACTIVE state and forwarding an RRC release message to the UE by the at least one first gNB-DU, wherein the UE context suspension indication is for indicating the at least one first gNB-DU to keep a UE context of SDT in the RRC_INACTIVE state, and the UE ID of SDT is for identifying the UE context of SDT.

In some embodiments, the at least one first gNB-DU includes the serving gNB-DU for the UE.

In some embodiments, the at least one first gNB-DU includes the serving gNB-DU and at least one non-serving gNB-DU belonging to the same gNB. In some cases, the UE in the RRC_INACTIVE state may perform cell reselection to other gNB-DU.

Figure 3:
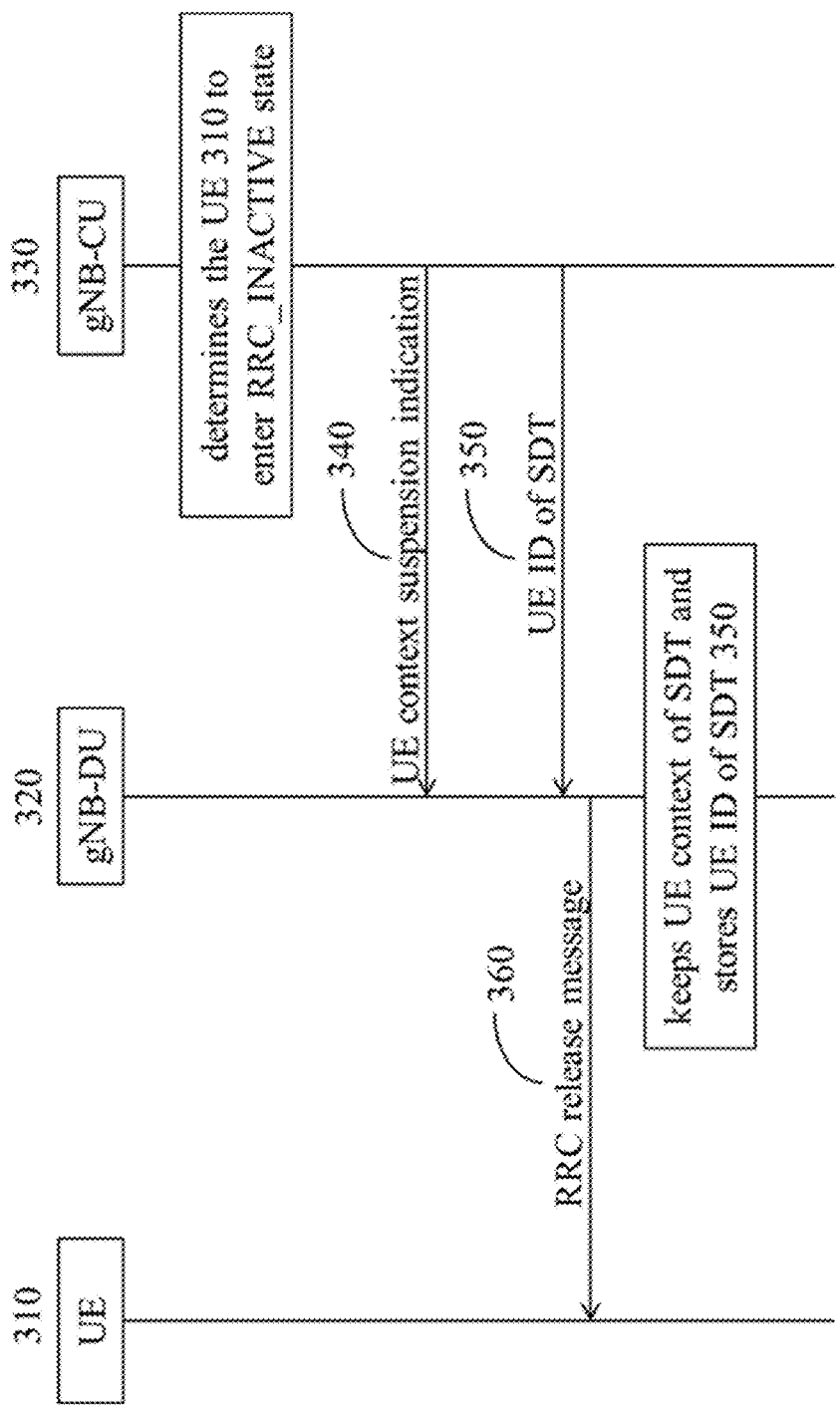
FIG. 3 illustrates an exemplary signaling sequence for SDT, in accordance with some embodiments of the present disclosure.

FIG. 3 illustrates an exemplary signaling sequence for SDT according to the method 200 as illustrated in FIG. 2.

As shown in FIG. 3 in combination with FIG. 2, in the operation 210, the gNB-CU 330 determines the UE 310 to enter into RRC inactive state but keep (i.e., not release) the UE context in the gNB-DU 320 at least for SDT; in the operation 220, the gNB-CU 330 sends a UE context suspension indication 340 and a UE ID of SDT 350 to the gNB-DU 320; in the operation 230, when the gNB-DU 320 receives the UE context suspension indication 340, the gNB-DU 320 stores the UE ID of SDT 350 and keep the UE contexts of the UE 310 at least for SDT; and in the operation 240, at the same time, the gNB-DU 320 treats the UE 310 as in the RRC_INACTIVE state, and forwards an RRC release message 360 to the UE 310.

The UE context suspension indication 340 is to indicate the gNB-DU 320 to keep the UE context of the UE 310 at least for SDT when UE 310 goes to the RRC_INACTIVE state; and the UE ID of SDT 350 which is used in a Uu interface is used for identifying the UE context of SDT for the UE 310.

In some embodiments, the gNB-CU 330 may send the message at least including the UE context suspension indication 340 and the UE ID of SDT 350 to at least one gNB-DU. The at least one gNB-DU may include the gNB-DU 320 and other gNB-DUs that are not shown in FIG. 3. Each of the at least one gNB-DU, when receiving the message, may store the UE ID of SDT 350, keep the UE context of SDT for the UE 310 at least for SDT, and treat the UE 310 as in the RRC_INACTIVE state.

In some embodiments, the UE context suspension indication 340 and the UE ID of SDT 350 are included in one message, and in some embodiments, this message may also include an RRCContainer. In some embodiments, this message is a F1-AP message.

In some embodiments, the UE context suspension indication 340 is a UE bearer context suspension indication for indicating the at least one first gNB-DU to keep the bearer context related to small data transmission.

In some embodiments, in the operation 210, the determination whether to make the UE 310 to perform SDT the RRC_INACTIVE state is made based on the UE capability of the UE 310, a quality of service (QoS) requirement of at least one protocol data unit (PDU) session, or an indication of possibility of SDT. In some embodiments, the indication of possibility of SDT is from the UE 310 or a core network (not shown in FIG. 3). The possibility of SDT means that the UE may perform SDT when it is in the RRC_INACTIVE state.

In some embodiments, the UE ID of SDT 350 is an inactive-radio network temporary identifier (I-RNTI), a short I-RNTI, a UE contention resolution identity, or the UE ID of SDT is a dedicated ID created for SDT.

In some embodiments, if the UE ID of SDT 350 is a UE contention resolution identity, the UE ID of SDT 350 contains a first 48 bits of a UL CCCH SDU if the UL CCCH SDU is longer than 48 bits.

In some embodiments, the UE context of SDT includes at least one of a F1-U GTP-U tunnel TNL info and a bearer configuration for SDT.

Figure 4:
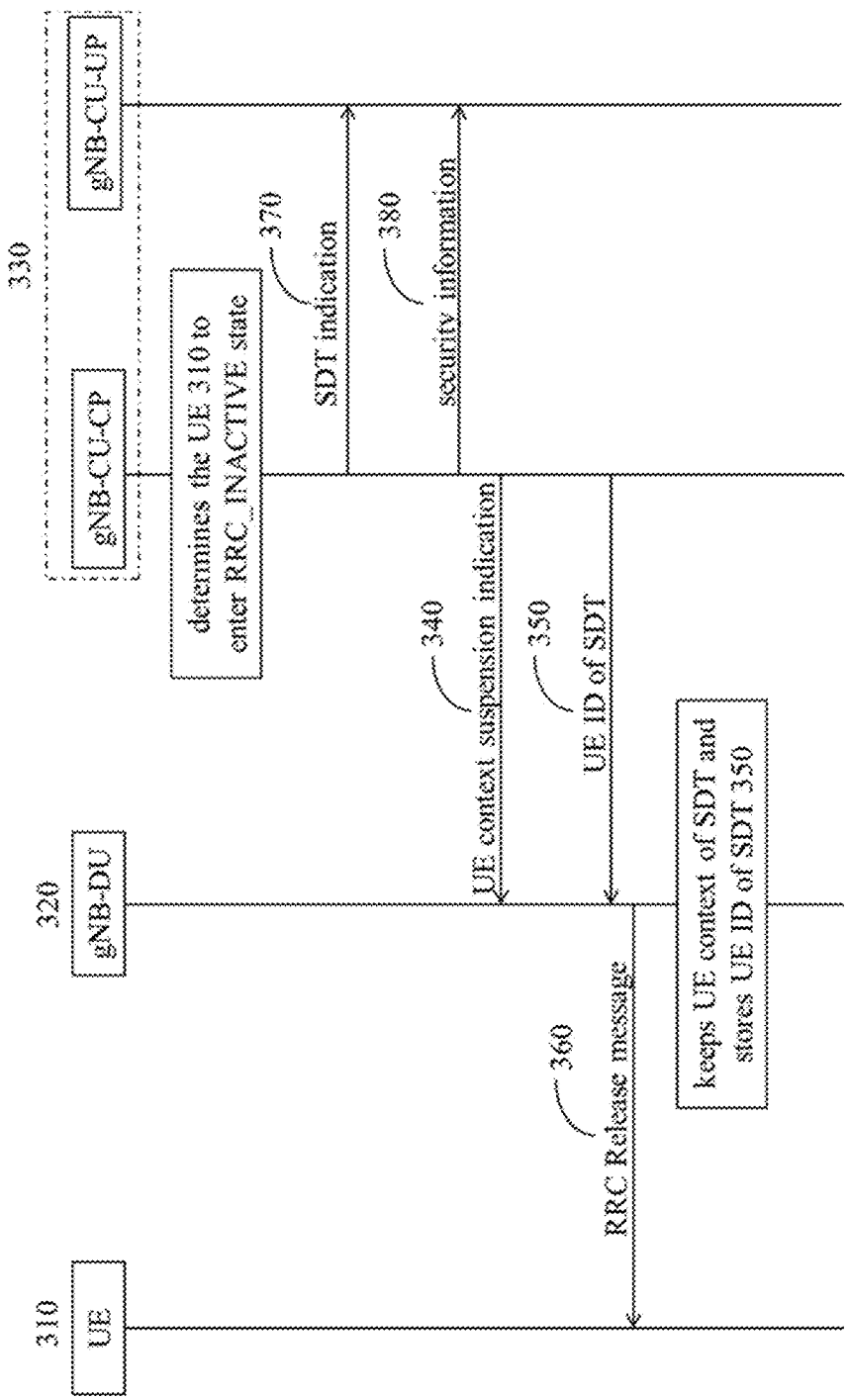
FIG. 4 illustrates an exemplary signaling sequence for SDT, in accordance with some embodiments of the present disclosure.

In some embodiments, the gNB-CU 330 may include a gNB-CU-CP and at least one gNB-CU-UP, the gNB-CU-CP determines whether to let the UE 310 to enter the RRC_INACTIVE state. FIG. 4 illustrates an exemplary signaling sequence for SDT based on the method 200 as shown in FIG. 2. As shown in FIG. 4, the gNB-CU includes one gNB-CU-CP and at least one gNB-CU-UP. In the operation 210, when the gNB-CU-CP determines to make the UE 310 to enter the RRC_INACTIVE state and perform SDT in the RRC_INACTIVE state, the gNB-CU-CP sends a SDT indication 370 and security information 380 to at least one gNB-CU-UP for SDT in the RRC_INACTIVE state. In another word, the method 200 may further include sending a SDT indication and updated security information to the at least one gNB-CU-UP by the gNB-CU-CP.

In some embodiments, the SDT indication 370 indicates a possibility of SDT when the UE being in the RRC_INACTIVE state. The updated security information 380 is for small data ciphering and/or deciphering by the at least one gNB-CU-UP, or for small data integrity protection and/or integrity detection by the at least one gNB-CU-UP. The updated security information may include a new the $K_{UPint}$ key and/or the $K_{UPenc}$ key or a new $K_{gNB}$ key which is driven in the gNB-CU-CP based on the current $K_{gNB}$ key or the NH, using the stored nextHopChainingCount. The $K_{UPenc}$ is a key derived by from $K_{gNB}$, which shall only be used for the protection of UP traffic between UE and gNB-CU-UP with a particular encryption algorithm; $K_{UPint}$ is a key derived from $K_{gNB}$, which shall only be used for the protection of UP traffic between UE and gNB-CU-UP with a particular integrity algorithm.

The UE 310 may send a small data in a message to a gNB-DU (e.g., the gNB-DU 320) when the UE 310 is in the RRC_INACTIVE state or in the RRC_CONNECTED state.

In some cases, the gNB-DU may or may not store the UE ID of SDT 350 and keep the UE context of SDT for the UE 310.

In some cases, the gNB to which their gNB-DU belongs is or is not the last serving gNB before the UE 310 enters the RRC INACTIVE state.

Figure 5:
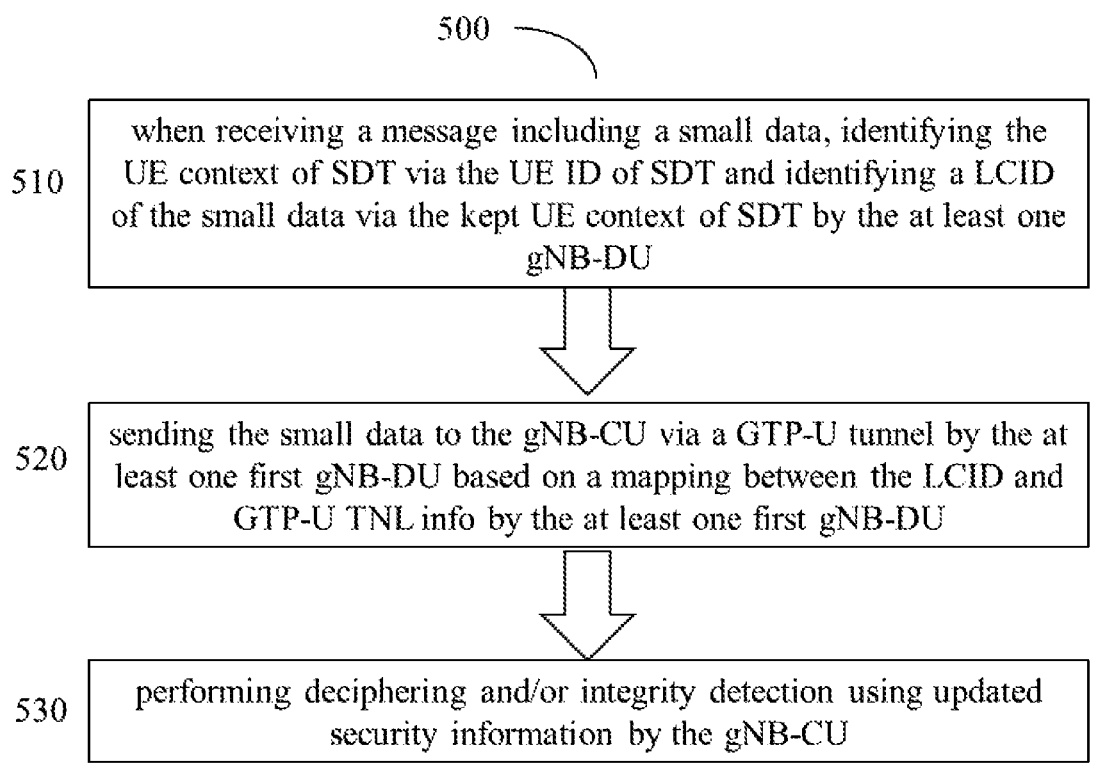
FIG. 5 illustrates an exemplary method for SDT, in accordance with some embodiments of the present disclosure.

FIG. 5 illustrates an exemplary method 500 for receiving a small data from a UE (e.g, the UE 310) by a gNB (e.g., the gNB including the gNB-DU 320 and the gNB-CU 330) according to some embodiments of the present disclosure. in FIG. 5, the UE is in the RRC_INACTIVE state, and a gNB-DU (e.g., the gNB-DU 320) stores the UE ID of SDT (e.g., the UE ID of SDT 350) and keeps the UE context of SDT for the UE when the UE enters the RRC_INACTIVE state according to the method 200.

As shown in FIG. 5, the method 500 may at least include an operation 510, an operation 520 and an operation 530. The operation 510 illustrates, when receiving a message including a small data from the UE by the at least one gNB-DU, the UE context of SDT is identified via the UE ID of SDT, and a LCID of the small data is identified via the UE context of SDT by the at least one gNB-DU. The operation 520 illustrates sending the small data to the gNB-CU via a general packet radio service (GPRS) tunneling protocol (GTP) user plane (GTP-U) tunnel by the at least one first gNB-DU based on a mapping between the LCID and GTP-U transport network layer (TNL) info by the at least one first gNB-DU. The operation 530 illustrates performing deciphering and/or integrity detection using updated security information by the gNB-CU. The updated security information may include a new the $K_{UPint}$ key and/or the $K_{UPenc}$ key or a new $K_{gNB}$ key which is driven in the gNB-CU based on the current $K_{gNB}$ key or the NH, using the stored nextHopChainingCount.

In some embodiments, the message is a Msg A of a 2-step RA or a Msg 3 of a 4-step RA.

In some embodiments, if the message is an Msg3, the message at least includes an RRC message (e.g., RRCResumeRequest) and UL data.

Figure 6:
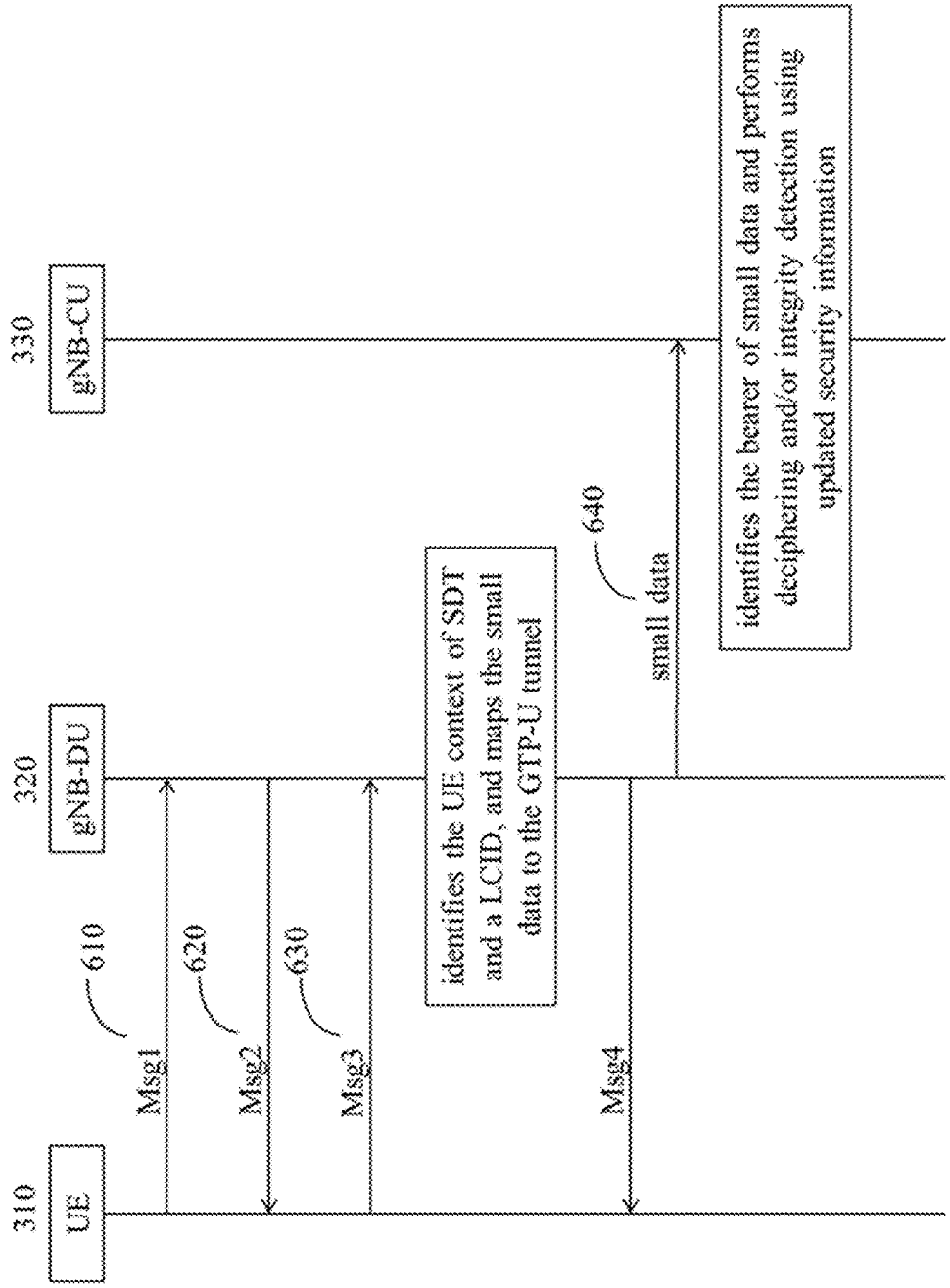
FIG. 6 illustrates an exemplary signaling sequence for SDT, in accordance with some embodiments of the present disclosure.

FIG. 6 illustrates an exemplary signaling sequence for SDT according to the method 500, wherein the message is an Msg 3 of a 4-step RA.

As shown in FIG. 6, the UE 310 sends a Msg1 610 to the gNB-DU 320, the gNB-DU 320 sends a Msg2 620 to the UE 310, and the UE 310 sends a Msg3 630 to the gNB-DU 320. The Msg3 630 at least includes an RRC message and a small data 640. In the operation 510, when the gNB-DU 320 receives the Msg3 630, the gNB-DU 320 identifies the UE context of SDT via the UE ID of SDT (e.g., the UE ID of SDT 350) and identifies a LCID of the small data via the UE context of SDT. In the operation 520, the gNB-DU 320 sends the small data 640 to the gNB-CU 330 (or the gNB-CU-UP of the gNB-CU 330) via a GTP-U tunnel based on a mapping between the LCID and the GTP-U TNL info (e.g., an internet protocol (IP) address, a tunnel end point identifier TEID, and etc.). In the operation 530, the gNB-CU 330 (or the gNB-CU-UP of the gNB-CU 330) identifies the bearer of small data according to the GTP-U TNL info, and performs deciphering and/or integrity detection using the updated security information.

In some embodiments, in the operation 510, if the UE ID of SDT is a UE contention resolution identity, the gNB-DU 320 identifies the UE context of SDT via matching a CCCH SDU with the UE ID of SDT stored in the operation 230.

In some embodiments, in the operation 510, if the UE ID of SDT is an I-RNTI or a short I-RNTI, the gNB-DU 320 reads the RRC message (e.g., RRCResumeRequest) and gets an I-RNTI or a short I-RNTI in the RRC message, and then the gNB-DU 320 identifies the UE context of SDT via matching the I-RNTI or the short I-RNTI with the UE ID of SDT stored in the operation 230.

In some embodiments, when sending the UE ID of SDT to the at least one gNB-DU, the gNB-CU also sends the UE ID of SDT to the UE (e.g., the UE 310), wherein the UE ID of SDT is an existing I-RNTI or an existing short I-RNTI, or the UE ID of SDT is a UE ID created by the gNB (e.g., the gNB-CU) and dedicated for SDT. Both the UE and the at least one gNB-DU store the UE ID of SDT locally. When performing SDT, the UE sends the UE ID of SDT together with the small data to the at least one gNB-DU, wherein the UE ID of SDT is sent in a MAC CE.

Figure 7:
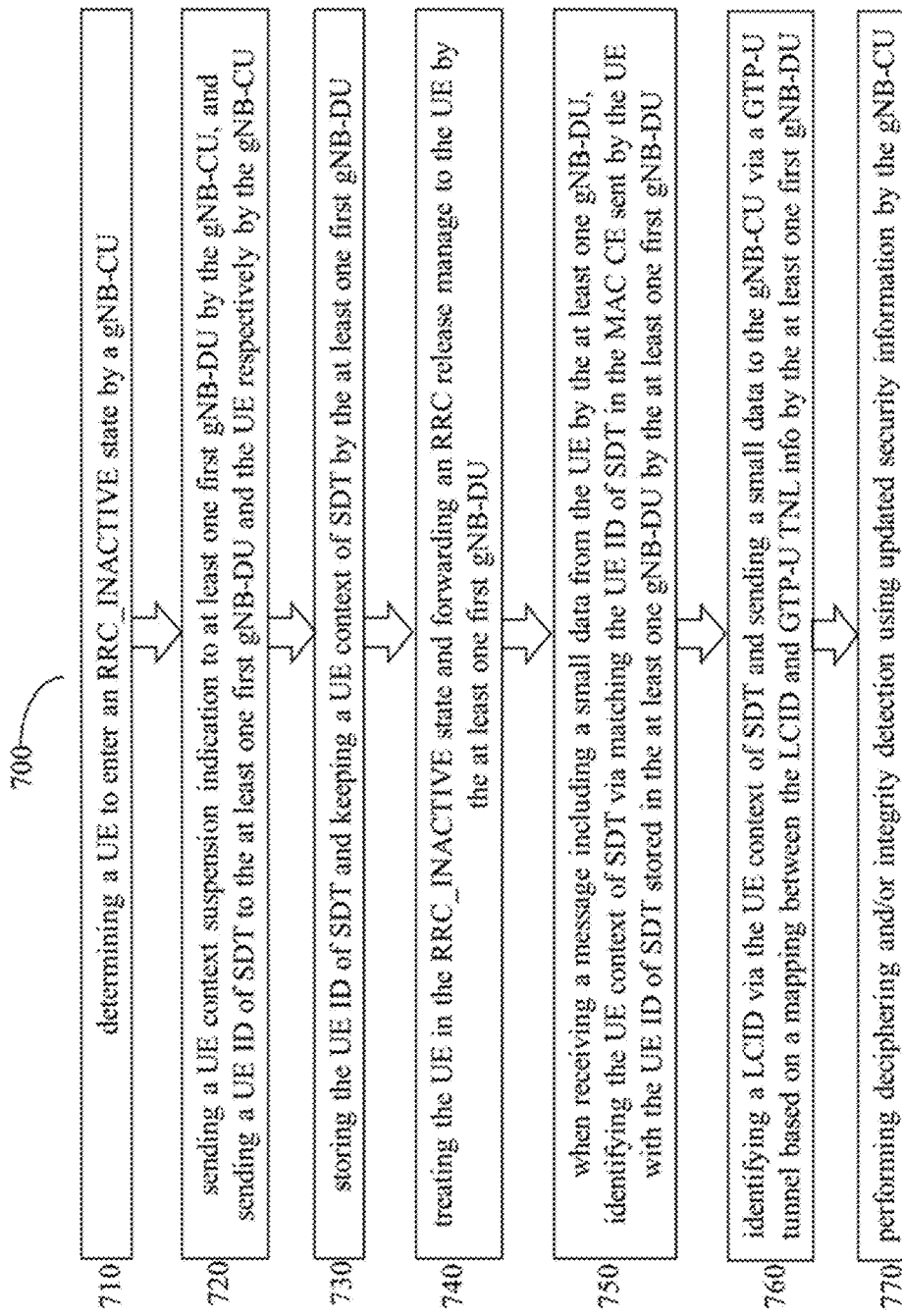
FIG. 7 illustrates an exemplary method for SDT, in accordance with some embodiments of the present disclosure.

FIG. 7 illustrates such an exemplary method 700 for SDT performed by a gNB based on the method 200. As shown in FIG. 7, the method 700 at least includes the following operations. The operation 710 illustrates determining a UE (e.g., the UE 310) to enter the RRC_INACTIVE state by a gNB-CU (e.g., the gNB-CU 330). The operation 720 illustrates sending a UE context suspension indication (e.g., the UE context suspension indication 340) to the at least one first gNB-DU by the gNB-CU, and sending a UE ID of SDT to the UE and the at least one gNB-DU by the gNB-CU, wherein the UE ID of SDT is stored by the UE and is sent by the UE to the at least one first gNB-DU in a medium access control (MAC) control element (CE) for SDT. The operation 730 illustrates storing the UE ID of SDT and keeping a UE context of SDT by the at least one first gNB-DU. The operation 740 illustrates treating the UE in the RRC_INACTIVE state and forwarding an RRC release manage to the UE by the at least one first gNB-DU. The operation 750 illustrates, when receiving a message including a small data from the UE by the at least one gNB-DU, identifying the UE context of SDT via matching the UE ID of SDT in the MAC CE sent by the UE with the UE ID of SDT stored locally in the at least one gNB-DU by the at least one first gNB-DU. The operation 760 illustrates identifying a LCID via the UE context of SDT and sending a small data to the gNB-CU via a GTP-U tunnel based on a mapping between the LCID and GTP-U TNL info by the at least one first gNB-DU. The operation 770 illustrates performing deciphering and/or integrity detection using updated security information by the gNB-CU.

In some embodiments, the UE ID of SDT is assigned by the gNB-CU.

In some embodiments, the UE ID of SDT is sent to the UE in an RRC release message.

Figure 8:
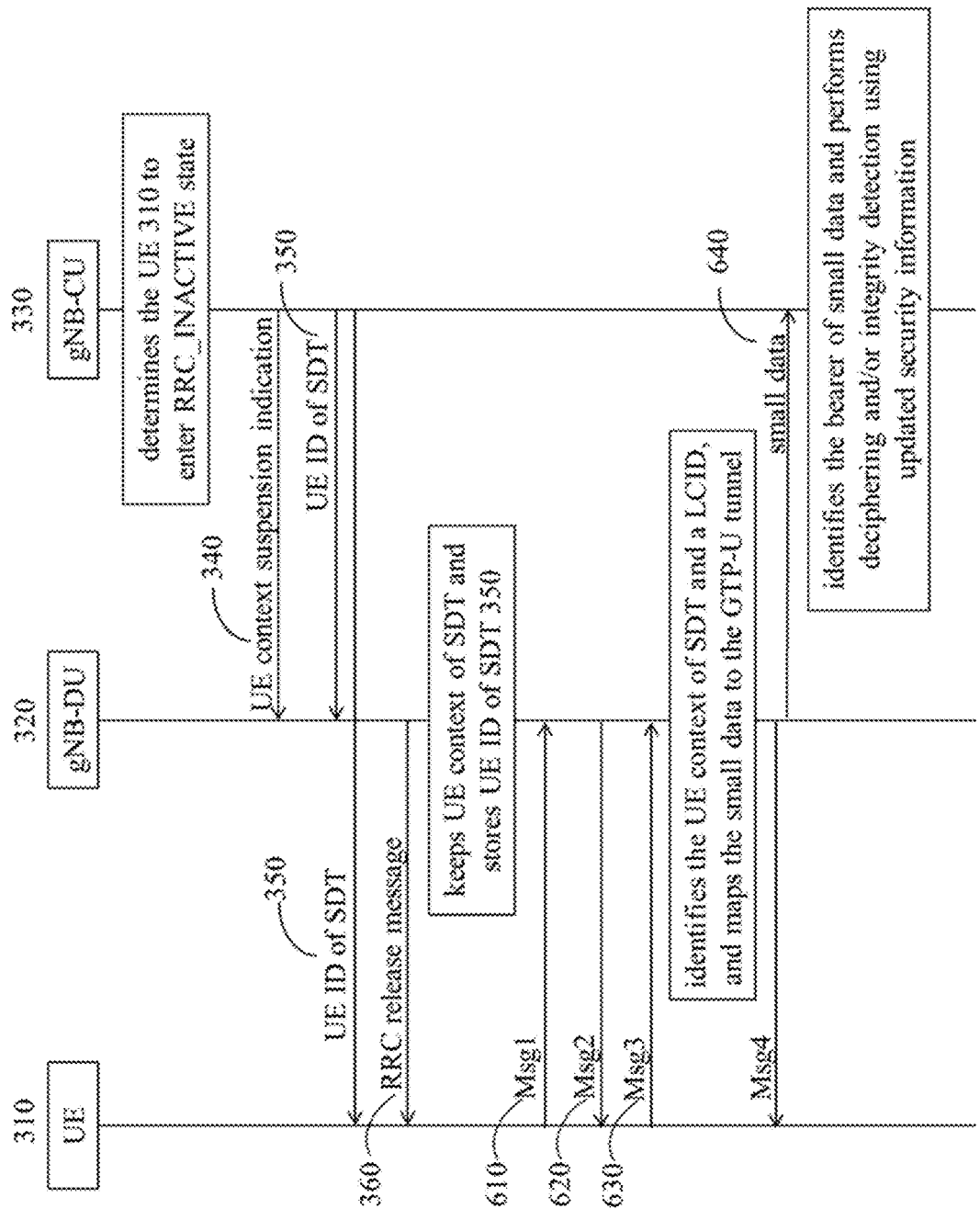
FIG. 8 illustrates an exemplary signaling sequence for SDT, in accordance with some embodiments of the present disclosure.

FIG. 8 illustrates an exemplary signaling sequence for SDT in accordance with the method 700. In this example, the RA is a 4-step RA.

As shown in FIG. 8 in combination with FIG. 7, in the operation 710, the gNB-CU 330 determines the UE 310 to enter into the RRC inactive state but keep the UE context in the gNB-DU 320 at least for SDT; in the operation 720, the gNB-CU 330 sends a UE context suspension indication 340 to the gNB-DU 320, furthermore, the gNB-CU 330 assigns a UE ID of SDT 350 and sends it to the gNB-DU 320 and the UE 310 respectively, wherein when receiving the UE ID of SDT 350, the UE 310 stores the UE ID of SDT 350, and when performing SDT, the UE 310 sends the UE ID of SDT 350 in a MAC CE together with the small data to the gNB-DU 320; in the operation 730, when the gNB-DU 320 receives the UE context suspension indication 340, the gNB-DU 320 stores the UE ID of SDT 350 and keep the UE contexts of the UE 310 at least for SDT; in the operation 740, at the same time, the gNB-DU 320 treats the UE 310 as in the RRC_INACTIVE state, and forwards an RRC release message 360 to the UE 310; in the operation 750, when performing SDT, the UE sends the UE ID of SDT in a MAC CE together with a small data 640 to the gNB-DU 320 via the Msg3 630, the gNB-DU 320 identifies the UE context of SDT via matching the UE ID of SDT in the MAC CE sent from the UE 310 with the UE ID of SDT 350 stored locally in the gNB-DU 320; in the operation 760, the gNB-DU 320 identifies the LCID via the locally kept UE context of SDT, and sends the small data 640 to the gNB-CU 330 via a GTP-U tunnel based on a mapping between the LCID and GTP-U TNL info; and in the operation 770, the gNB-CU 330 identifies the bearer of small data according to the GTP-U TNL info and performs deciphering and/or integrity detection using the updated security information.

In some embodiments, the UE ID of SDT 350 is sent to the UE in the RRC release message 360.

Figure 9:
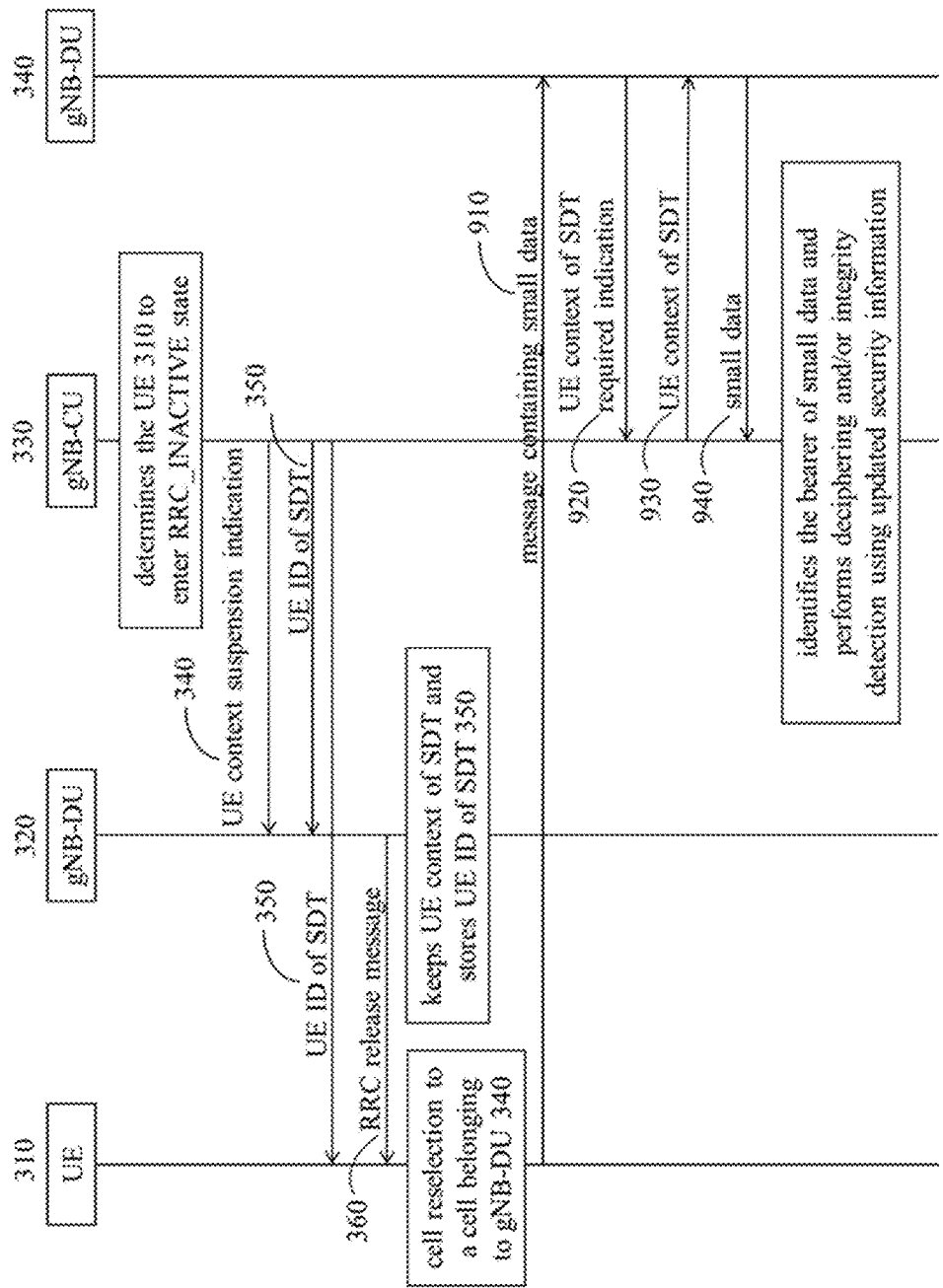
FIG. 9 illustrates an exemplary signaling sequence for SDT, in accordance with some embodiments of the present disclosure.

In some embodiments, the gNB-CU sends a UE ID of SDT to the UE and a first gNB-DU respectively. However, when the UE (e.g., the UE 310) is in the RRC_INACTIVE state, the UE may perform cell reselection to a cell belonging to a second gNB-DU which has no stored UE context of SDT. When the UE sends the UE ID of SDT together with a small data to the second gNB-DU, the second gNB-DU cannot identify the corresponding UE context of SDT. The second gNB-DU may send a UE context of SDT required indication to a gNB-CU that both the first gNB-DU and the second gNB-DU belong to, wherein the UE context for SDT required indication is for UE context retrieval from the gNB-CU and contains info about the UE ID of SDT received from the UE. The gNB-CU retrieves the corresponding UE context of SDT and sent it to the second gNB-DU. Based on the UE context of SDT, the second gNB-DU may identify the LCID via the UE context of SDT and send the small data to the gNB_CU via a GTP-U tunnel based on a mapping between the LCID and GTP-U TNL info by the second gNB-DU, and the gNB-CU may perform deciphering and/or integrity detection using updated security information. FIG. 9 illustrates a corresponding exemplary signaling sequence for SDT, wherein the RA is a 4-step RA, and the UE sent the small data and the UE ID of SDT via a message (e.g., an MsgA of a 2-step random access (RA) or an Msg3 of a 4-step RA).

As shown in FIG. 9, the gNB-CU 330 assigns and sends the UE ID of SDT 350 to the UE 310 and the gNB-DU 320 respectively. The gNB-DU 320 keeps the UE context of SDT (i.e., the UE context of SDT 920), stores the UE ID of SDT 350, and forwards the RRC release message 360 to the UE 310. The UE 310 enters the RRC_INACTIVE state. In some embodiments, the UE ID of SDT 350 is sent to the UE 310 in the RRC release message 360.

However, when the UE 310 is in the RRC_INACTIVE state, it may perform a cell reselection to another cell belonging to the gNB-DU 340, yet the gNB-DU 340 neither stores the UE ID of SDT 350 nor keeps the UE context of SDT. When the UE 310 performs SDT in the RRC_INACTIVE state, the UE 310 sends a message 910 including a small data and the UE ID of SDT to the gNB-DU 340. However, the gNB-DU 340 may not identify the UE context of SDT of the UE 310 according to the UE ID of SDT contained in the message 910. The gNB-DU 340 may send a UE context of SDT required indication 920 to the gNB-CU 330, wherein the UE context of SDT required indication 920 contains info about the UE ID of SDT received from the UE 310 via the message 910. After receiving the UE context of SDT required indication 920, the gNB-CU 330 retrieves the corresponding UE context of SDT 930 according to the UE ID of SDT sent from the UE 310, and sends the UE context of SDT 930 to the gNB-DU 340. Based on the UE context of SDT 930, the gNB-DU 340 identifies a LCID of the small data 940 contained in the message 910, and sends the small data 940 to the gNB-CU 330 (or the gNB-CU-UP of the gNB-CU 330) via a GTP-U tunnel based on a mapping between the LCID and the GTP-U TNL info. The gNB-CU 330 (or the gNB-CU-UP of the gNB-CU 330) identifies the bearer of small data according to the GTP-U TNL info, and performs deciphering and/or integrity detection using the updated security information.

In some embodiments, the message 910 is a MsgA of a 2-step random access (RA) or a Msg3 of a 4-step RA, and other RA related messages are not shown in FIG. 9 for simplification.

Figure 10:
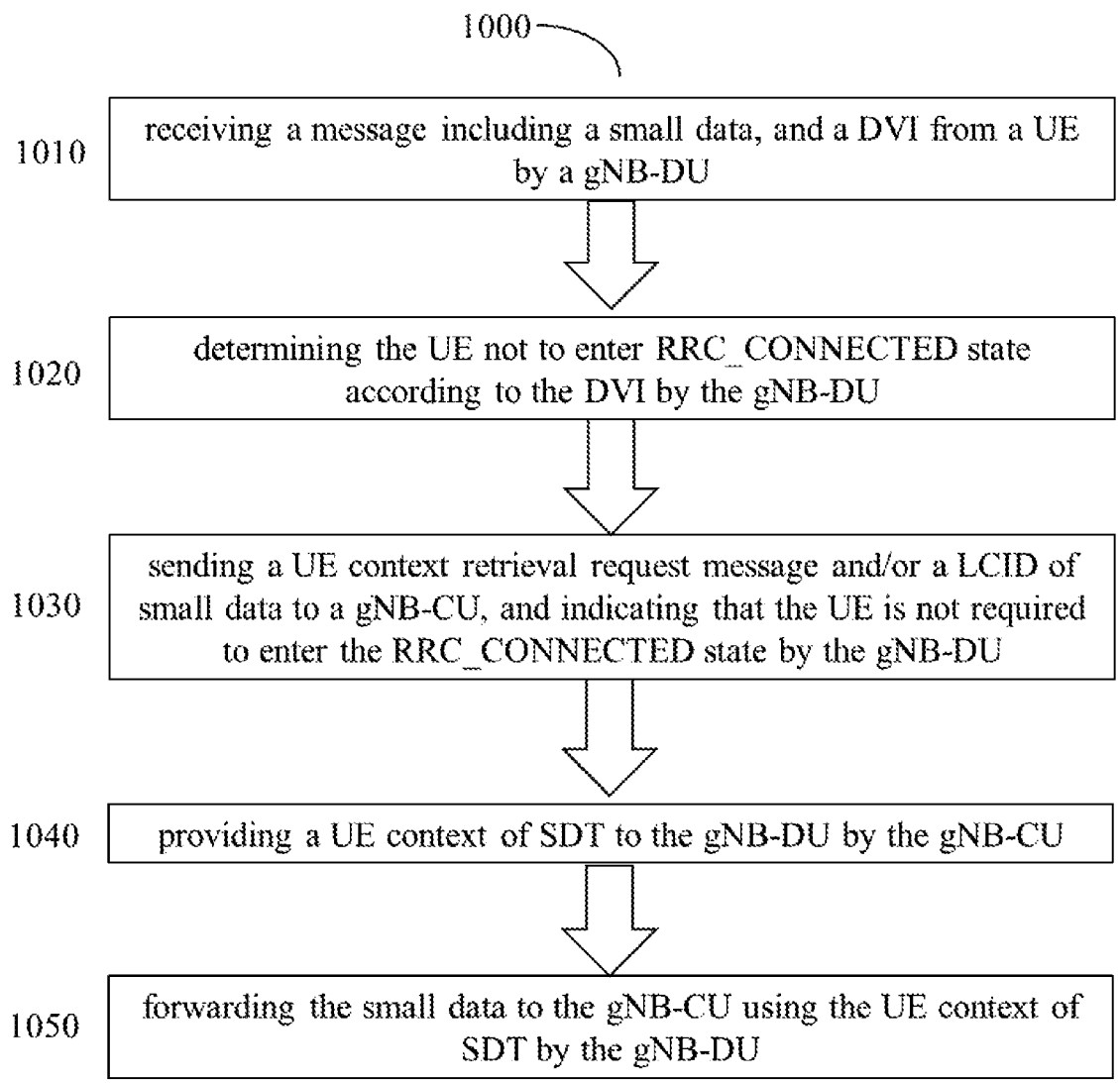
FIG. 10 illustrates an exemplary method for SDT, in accordance with some embodiments of the present disclosure.

FIG. 10 illustrates an exemplary method 1000 for SDT performed by a gNB according to some embodiments of the present disclosure, wherein the gNB-DU has no UE context of SDT for the UE when the UE performs SDT in the RRC_INACTIVE state. The gNB-DU of the gNB may make the decision whether let the UE to enter the RRC_CONNECTED state or let the UE still be in the RRC_INACTIVE state.

As shown in FIG. 10, the method 1000 may at least include the following operations. The operation 1010 illustrates receiving a message including a small data, and a DVI from a UE by a gNB-DU. The operation 1020 illustrates determining the UE not to enter the RRC_CONNECTED state according to the DVI by the gNB-DU, wherein the DVI indicates it is a SDT. The operation 1030 illustrates sending a UE context retrieval request message and/or a LCID of small data to a gNB-CU and indicating that the UE is not required to enter the RRC_CONNECTED state by the gNB-DU. The operation 1040 illustrates providing a UE context of SDT to the gNB-DU by the gNB-CU. The operation 1050 illustrates forwarding the small data to the gNB-CU using the UE context of SDT by the gNB-DU.

Figure 11:
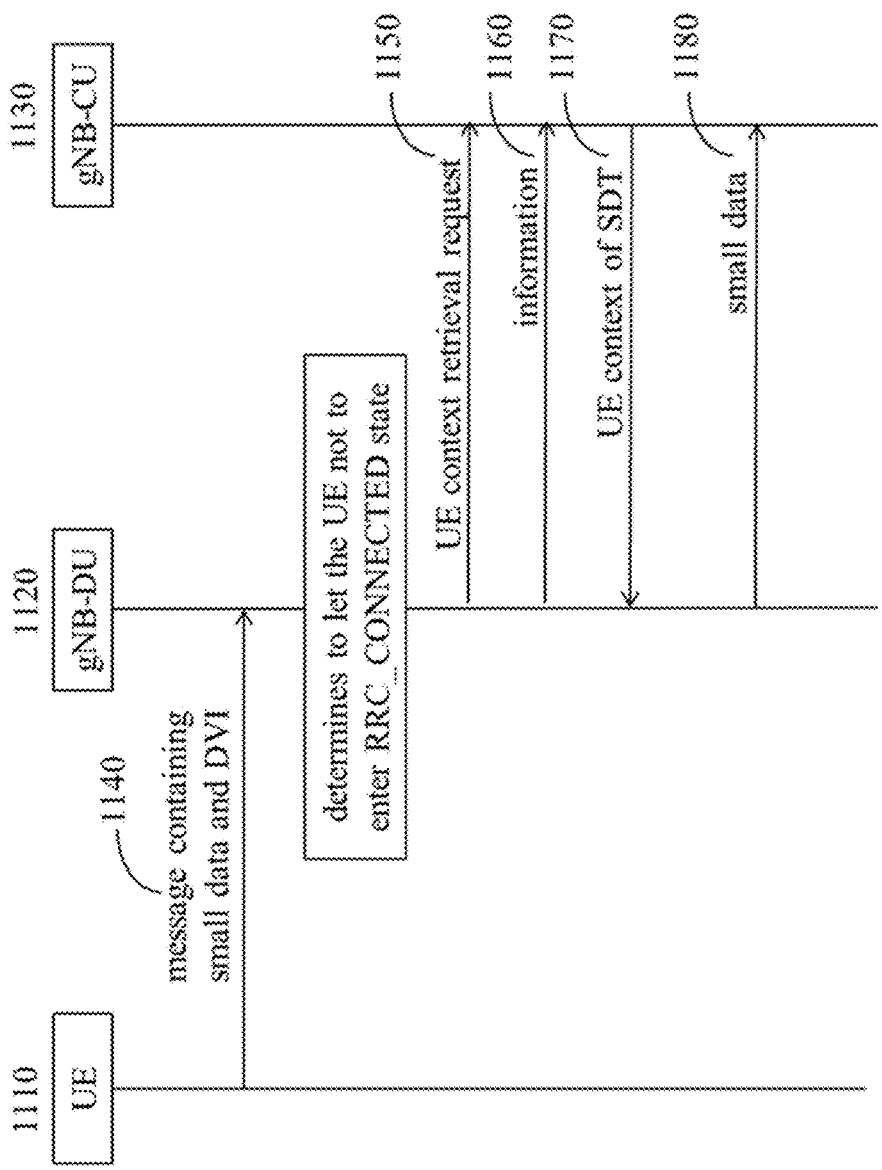
FIG. 11 illustrates an exemplary signaling sequence for SDT, in accordance with some embodiments of the present disclosure.

FIG. 11 illustrates an exemplary signaling sequence for SDT according to the method 1000, wherein the gNB to which the gNB-DU 1120 and the gNB-CU 1130 belong is the last serving gNB before the UE 1110 enters the RRC_INACTIVE state.

As shown in FIG. 11, the gNB-DU 1120 receives a message 1140 which includes a small data and a DVI from the UE 1110, wherein the DVI is to indicate the data volume for SDT to be sent or the DVI corresponds to a 2-bit access stratum release assistance indication (please refer to Table 1) or request entering RRC_CONNECTED state indication or buffer status.

TABLE 1

| Codepoint/Index | Value |
| --- | --- |
| 00 | No RAI information |
| 01 | No subsequent DL and UL data transmission is expected |
| 10 | A single subsequent DL transmission is expected |
| 11 | Reserved |

In the operation 1010, the gNB-DU 1120 receives a message including a small data and a DVI from the UE 1110. In the operation 1020, the gNB-DU 1120 determines the UE not to enter the RRC_CONECTED state according to the DVI. In the operation 1030, the gNB-DU 1120 sends a UE context retrieval request message 1150 to the gNB-CU 1130; furthermore, the gNB-DU 1120 sends an information 1160 to the gNB-CU 1130, wherein the information 1160 indicates to the gNB-CU 1130 that the UE 1110 is not required to enter the RRC_CONNECTED state, wherein the information 1160 may also provide a LCID of small data to the gNB-CU 1130, so that the gNB-CU 1130 may identify the bearer of the small data. The gNB-CU 1130 may not provide the whole UE context but only provide the bearer context related to the small data transmission to the gNB-DU 1120. In the operation 1040, after receiving the UE context retrieval request message 1150 and the information 1160, the gNB-CU 1130 provides the UE context of SDT 1170 to the gNB-DU 1120. In the operation 1050, the gNB-DU 1120 forwards the small data 1180 to the gNB-CU 1130 using the UE context of SDT 1170.

In some embodiments, the DVI is in a MAC CE.

In some embodiments, when receiving the UE context of SDT 1170, the gNB-DU 1120 may start a time. When the timer expires, the gNB-DU 1120 may release the UE context of SDT 1170.

In some embodiments, the message 1140 containing the small data and the DVI is a MsgA of a 2-step random access (RA) or a Msg3 of a 4-step RA; wherein other RA related messages are not shown in FIG. 11 for simplification.

Figure 12:
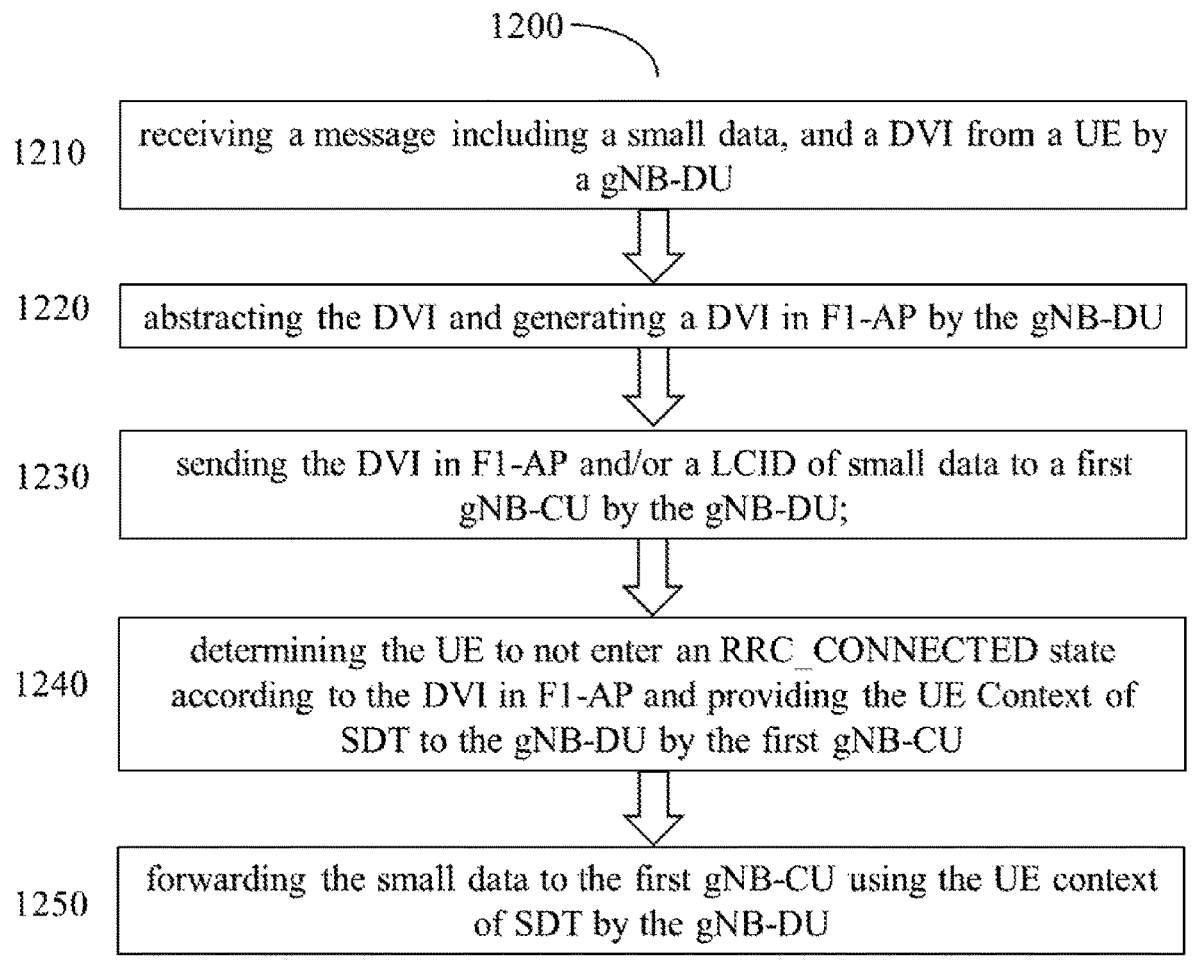
FIG. 12 illustrates an exemplary method for SDT, in accordance with some embodiments of the present disclosure.

FIG. 12 illustrates an exemplary method 1200 for SDT performed by a gNB according to some embodiments of the present disclosure, wherein the gNB-DU has no UE context of SDT for the UE.

In some embodiments, the gNB to which the first gNB-CU and the gNB-DU belong is the last serving gNB. When the UE performs SDT in the RRC_INACTIVE state, the first gNB-CU of the gNB makes the decision whether let the UE to enter the RRC_CONNECTED state or let the UE to still be in the RRC_INACTIVE state.

As shown in FIG. 12, the method 1200 may at least include the following operations. The operation 1210 illustrates receiving a message including a small data, and a DVI from a UE by a gNB-DU. The operation 1220 illustrates abstracting the DVI and generating a DVI in F1-AP by the gNB-DU. The operation 1230 illustrates sending the DVI in F1-AP and/or a LCID of small data to a first gNB-CU by the gNB-DU. The operation 1240 illustrates determining the UE not to enter the RRC_CONNECTED state according to the DVI in F1-AP and providing the UE Context of SDT to the gNB-DU by the first gNB-CU. The operation 1250 illustrates forwarding the small data to the first gNB-CU using the UE context of SDT by the gNB-DU. In this example, the gNB-DU and the first gNB-CU belong to the last serving gNB before the UE enter the RRC_INACTIVE state.

In some embodiments, the operation 1240 further includes identifying a UE context of SDT by the first gNB-CU.

Figure 13:
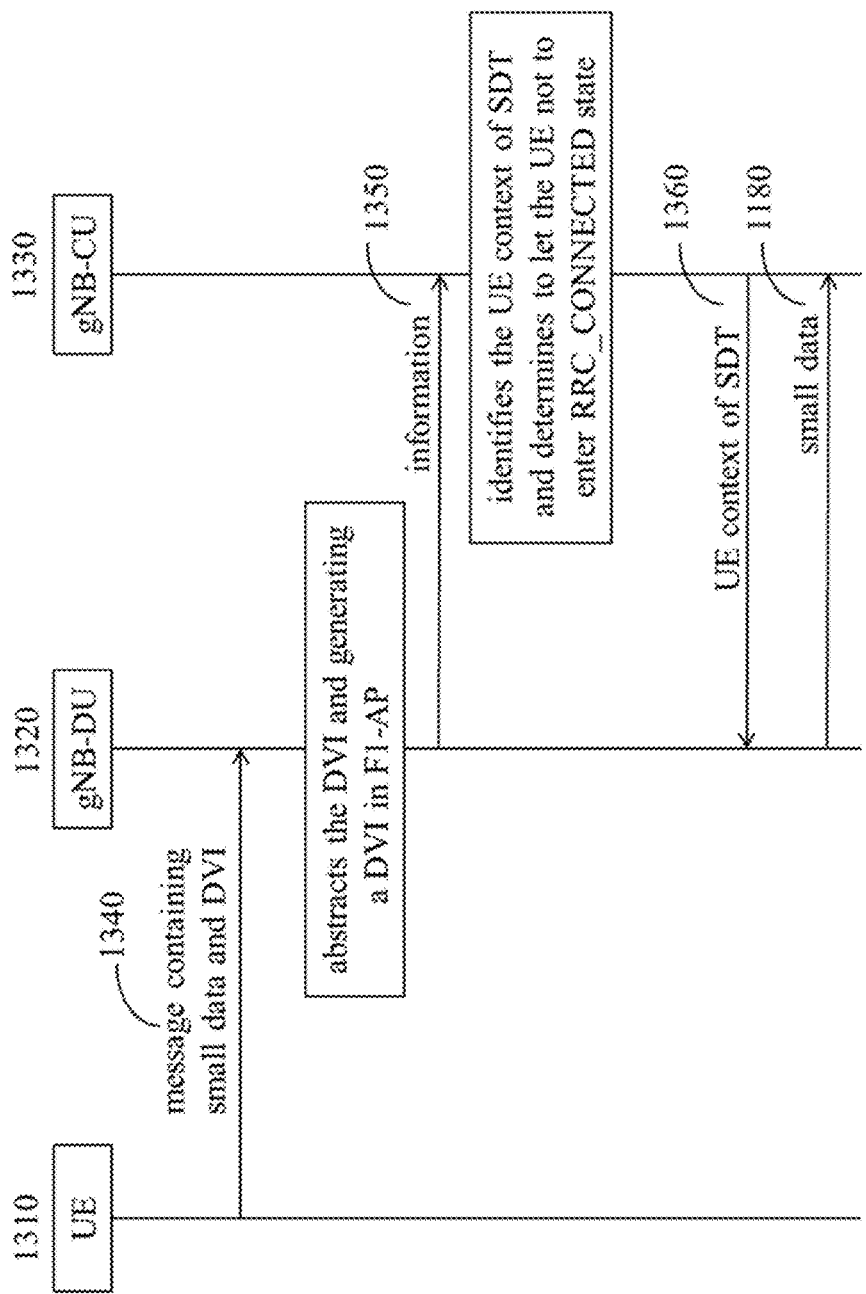
FIG. 13 illustrates an exemplary signaling sequence for SDT, in accordance with some embodiments of the present disclosure.

FIG. 13 illustrates an exemplary signaling sequence for SDT according to the method 1200.

As shown in FIG. 13 in combination with FIG. 12, the gNB-DU 1320 belongs to the gNB-CU 1330 (i.e., the first gNB-CU in the method 1200), the gNB-DU 1320 and the gNB-CU 1330 belong to the last serving gNB before the UE 1310 enters the RRC_INACTIVE state. In the operation 1210, the gNB-DU 1320 receives a message 1340 which includes a small data and a DVI from the UE 1310, wherein the DVI is to indicate the data volume for SDT to be sent or the DVI corresponds to a 2-bit access stratum release assistance indication. In the operation 1220, the gNB-DU 1220 abstracts the DVI and generates a DVI in F1-AP. In the operation 1230, the gNB-DU 1220 sends the information 1350 to the gNB-CU 1330 (i.e., the first gNB-CU), wherein the information contains the DVI in F1-AP and/or a LCID of small data. In the operation 1240, the first gNB-CU 1330 determines the UE not to enter an RRC_CONNECTED state according to the DVI in F1-AP and provides the UE context of SDT 1360 to the gNB-DU 1320, wherein the operation 1240 may further include identifying the UE context of SDT 1360. In the operation 1250, the gNB-DU 1320 forwards the small data 1180 to the gNB-CU 1330 using the UE context of SDT 1360.

In some embodiments, the DVI is in a MAC CE.

In some embodiments, when receiving the UE context of SDT 1360, the gNB-DU 1320 may start a timer, and when the timer expires, the gNB-DU 1320 releases the UE context of SDT 1360.

In some embodiments, the message 1340 containing the small data and the DVI is a MsgA of a 2-step random access (RA) or a Msg3 of a 4-step RA; wherein other RA related messages are not shown in FIG. 13 for simplification.

In the previously mentioned methods and corresponding signaling sequence examples, the gNB is the last serving gNB before the UE enters the RRC_INACTIVE state.

However, when the UE is in the RRC_INACTIVE state, the UE may perform a cell reselection to a cell belonging to a gNB which is not the last serving gNB. In such cases, the gNB-DU and the first gNB-CU mentioned in the method 1200 do not belong to the last serving gNB before the UE enters the RRC_INACTIVE state.

In such cases, when the UE performs SDT in the RRC_INACTIVE state, the first gNB-CU of the gNB may make the decision whether let the UE to enter the RRC_CONNECTED state. If the gNB-CU determines not let the UE to enter the RRC_CONNECTED state, as the gNB-CU has no the UE context of SDT, it may request the last serving gNB (or the gNB-CU of the last serving gNB) to provide the UE context of SDT to the gNB-DU.

Still referring to FIG. 12, the first gNB-CU and the gNB-DU belong to a gNB that is not the last serving gNB for the UE. When the UE performs SDT in the RRC_CONNECTED state, if the first gNB-CU determines not let the UE to enter the RRC_CONNECTED state, it may request the last serving gNB (or the gNB-CU 1440 of the last serving gNB) to provide the UE context of SDT to the gNB-DU. The operation 1240 may include the following operations: resolving a second gNB-CU contained in an I-RNTI of the RRC message by the first gNB-CU; providing the DVI in F1-AP and the LCID of small data to the second gNB-CU by the first gNB-CU; requesting the second gNB-CU to providing the UE context by the first gNB-CU; identifying a UE context of SDT by the second gNB-CU; determining the UE not to enter the RRC_CONNECTED state and providing the UE context of SDT to the first gNB-CU by the second gNB-CU; and forwarding the UE context of SDT to the gNB-DU by the first gNB-CU, wherein the second gNB-CU belongs to the last serving gNB before the UE enters the RRC_INACTIVE state. The corresponding signaling sequence is shown in FIG. 14.

Figure 14:
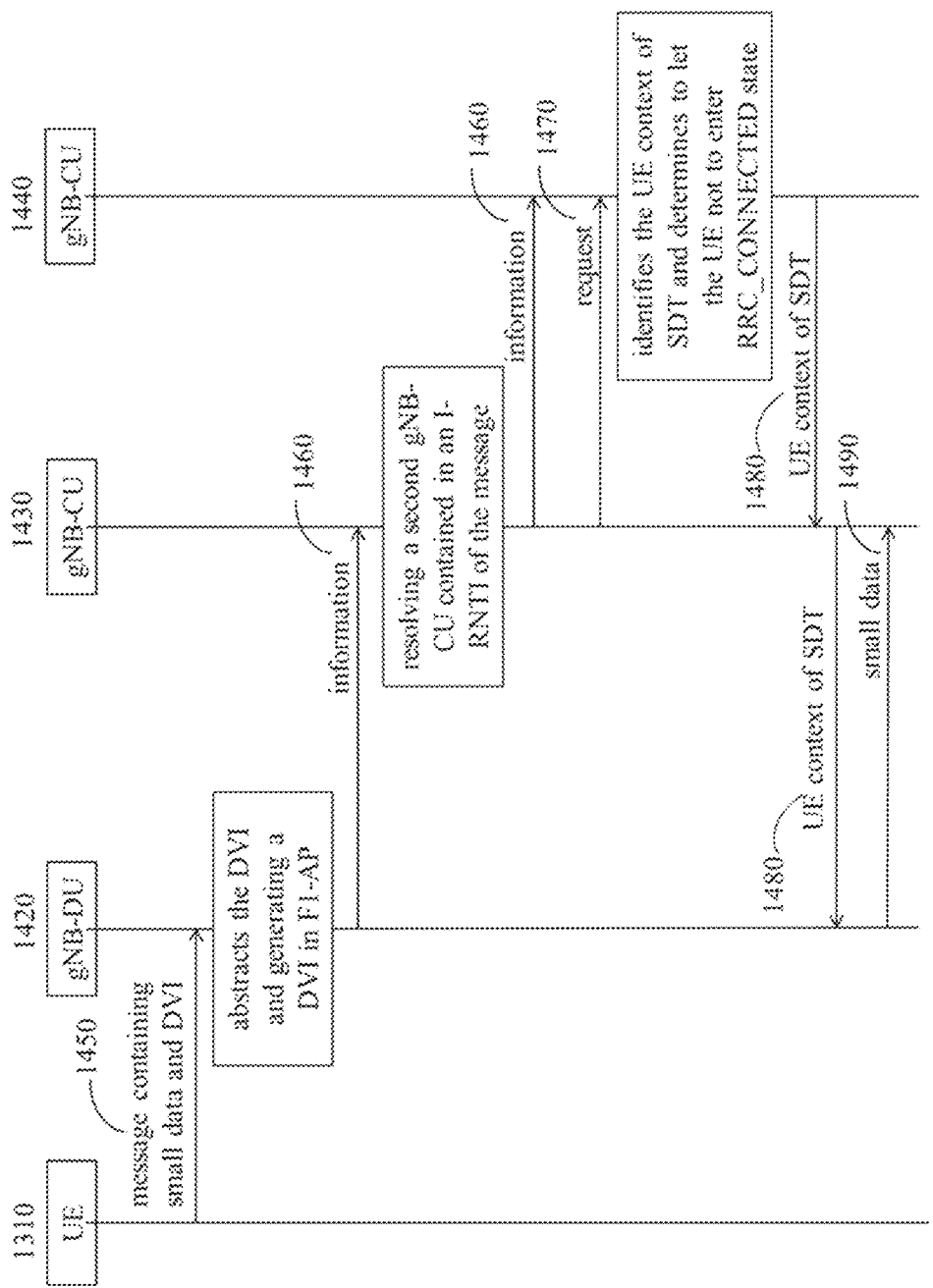
FIG. 14 illustrates an exemplary method for SDT, in accordance with some embodiments of the present disclosure.

As shown in FIG. 14 in combination with the method 1200, the gNB-DU 1420 and the gNB-CU 1430 (i.e., the first gNB-CU) belong to a gNB that is not the last serving gNB for the UE 1410, and the gNB-CU 1440 (i.e., the second gNB-CU) belongs to the last serving gNB for the UE 1410.

In the operation 1210, the gNB-DU 1420 receives a message 1450 which includes a small data and a DVI from the UE 1310. In the operation 1220, the gNB-DU 1420 abstracts the DVI and generates a DVI in F1-AP. In the operation 1230, the gNB-DU 1420 sends the information 1460 to the first gNB-CU (i.e., the gNB-CU 1430), wherein the information contains the DVI in F1-AP and/or a LCID of small data.

In the operation 1240, the gNB-CU 1430 resolves a second gNB-CU (i.e., the gNB-CU 1440 belonging to the last serving gNB for the UE 1310) contained in an I-RNTI of the RRC message, sends the information 1460 to the second gNB-CU (i.e., the gNB-CU 1440), and sends a request 1470 for requesting the second gNB-CU to provide a UE context of SDT; the second gNB-CU identifies the UE context of SDT, determines the UE 1310 not to enter the RRC_CONNECTED state, and provides the UE context of SDT 1480 to the first gNB-CU; and the first gNB-CU forwards the UE context of SDT 1480 to the gNB-DU 1420.

In the operation 1250, the gNB-DU 1320 forwards the small data 1490 to the gNB-CU 1430 using the UE context of SDT 1480.

The present disclosure provides various methods and embodiments for UL SDT and related signaling flow between the gNB-CU and gNB-DU for SDT when the UE is in the RRC_INAVTIVE state. Furthermore, the present disclosure implements SDT between a UE in the RRC_INAVTIVE state and a gNB which is either the last serving gNB or another gNB. According to the present disclosure, the power consumption of the UE and signaling overhead for SDT are decreased.

The spirit of the present disclosure is not limited to the method, embodiments, and examples described previously. Actually, these methods, embodiments, and examples may be reasonably modified and expanded, and can be reasonably combined without contradicting each other, as long as they do not violate the spirit or principle of the present invention.

For example, in FIG. 2, the operations 230 and 240 may be carried out at the same time.

For example, in FIG. 4, the UE context suspension indication 340 and the UE ID of SDT 350 may be sent together in a F1-AP message at the same time, and the SDT indication 370 and the security information 380 may be sent together.

For example, in FIG. 9, the gNB-CU 330 may send the UE ID of SDT 350 to the UE 310 and the gNB-DU 320 at the same time, or the gNB-CU 330 may send the UE ID of SDT 350 to the UE 310 before sending the UE ID of SDT 350 to the gNB-DU 320.

Furthermore, in some signaling sequences, some messages/signaling are not shown for simplification.

Figure 15:
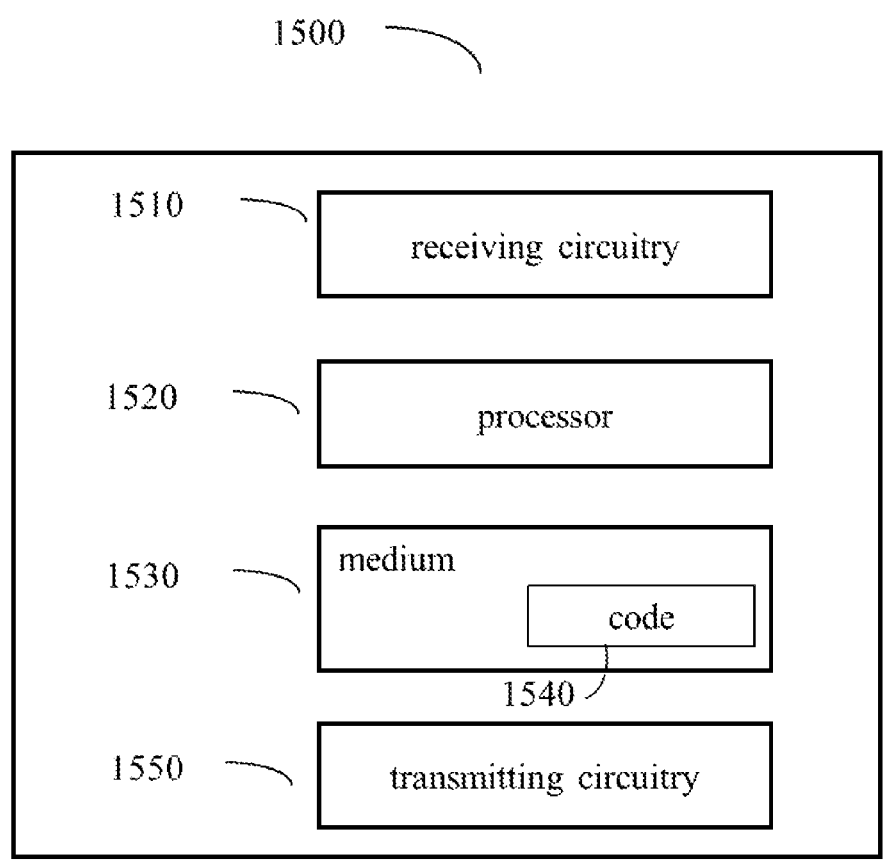
FIG. 15 illustrates an exemplary apparatus, in accordance with some embodiments of the present disclosure.

FIG. 15 illustrates an exemplary apparatus 1500 for performing the various methods, embodiments, or examples mentioned previously, or any methods or embodiments expanded reasonably based on these methods, embodiments, or examples.

As shown in FIG. 15, the apparatus 1500 may include at least one receiving circuitry 1510, at least one processor 1520, at least one non-transitory computer-readable medium 1530 with computer-executable 1540 stored thereon, and at least one transmitting circuitry 1550. The at least one medium 1530 and the computer program code 1540 may be configured to, with the at least one processor 1520, cause the apparatus 1500 to perform at least the exemplary methods and the embodiments described above, wherein, for example, the apparatus 1500 may be a UE (e.g., the UE 310, the UE 1110, the UE 1310, the UE 1410), or a part of the UE.

In various embodiments, the at least one processor 1520 may include, but not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, the at least one processor 1520 may also include at least one other circuitry or element not shown in FIG. 15.

In various embodiments, the at least one medium 1530 may include at least one storage medium in various forms, such as a volatile memory and/or a non-volatile memory. The volatile memory may include, but not limited to, for example, an RAM, a cache, and so on. The non-volatile memory may include, but not limited to, for example, an ROM, a hard disk, a flash memory, and so on. Further, the at least medium 1530 may include, but are not limited to, an electric, a magnetic, an optical, an electromagnetic, an infrared, or a semiconductor system, apparatus, or device or any combination of the above.

Further, in various embodiments, the exemplary apparatus 1600 or 1700 may also include at least one other circuitry, element, and interface, for example antenna element, and the like.

In various embodiments, the circuitries, parts, elements, and interfaces in the exemplary apparatus 1500, including the at least one processor 1520 and the at least one medium 1530, may be coupled together via any suitable connections including, but not limited to, buses, crossbars, wiring and/or wireless lines, in any suitable ways, for example electrically, magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. An apparatus, comprising:
   a memory; and
   a processor coupled to the memory, the processor configured to cause the apparatus to:
   determine, by a gNB central unit (gNB-CU), that a user equipment (UE) is to enter an RRC_INACTIVE state;
   send, by the gNB-CU, a UE context suspension indication and a UE identification (ID) of small data transmission (SDT) to at least one first gNB distributed unit (gNB-DU);
   store, by the at least one first gNB-DU, the UE ID of SDT and keep a UE context of SDT; and
   treat, by the at least one first gNB-DU, the UE in the RRC_INACTIVE state and forward a radio resource control (RRC) release message to the UE; wherein:
   the UE context suspension indication is for indicating the at least one first gNB-DU to keep the UE context of SDT in the RRC_INACTIVE state, and the UE ID of SDT is for identifying the UE context of SDT.

2. The apparatus of claim 1, wherein the UE ID of SDT is comprises one or more of an inactive-radio network temporary identifier (I-RNTI), a short I-RNTI, a UE contention resolution identity, or a dedicated ID created for SDT.

3. The apparatus of claim 1, wherein the processor is configured to cause the apparatus to:
   identify, when receiving a message including a small data from the UE by the at least one first gNB-DU, the UE context of SDT via the UE ID of SDT and a logical channel identifier (LCID) of the small data via the UE context of SDT;
   send, by the at least one first gNB-DU, the small data to the gNB-CU via a general packet radio service (GPRS) tunneling protocol (GTP) user plane (GTP-U) tunnel and based on a mapping between the LCID and GTP-U transport network layer (TNL) info; and
   perform, by the gNB-CU, one or more of deciphering or integrity detection using updated security information.

4. The apparatus of claim 3, wherein to identify the UE context of SDT via the UE ID of SDT, the processor is configured to cause the apparatus to one or more of:
   identify, by the gNB-DU, the UE context of SDT via matching a common control channel (CCCH) service data unit (SDU) with the UE ID of SDT in response to a determination that the UE ID of SDT is a UE contention resolution identity; or
   match, by the at least one first gNB-DU, an I-RNTI or a short I-RNTI contained in the RRC message with the UE ID of SDT in response to a determination that the UE ID of SDT is one or more of an I-RNTI or a short I-RNTI.

5. The apparatus of claim 1, wherein the processor is configured to cause the apparatus to:
   send, by the gNB-CU, the UE ID of SDT to the UE, wherein the UE ID of SDT is stored by the UE and is sent by the UE to the at least one first gNB-DU in a medium access control (MAC) control element (CE) for SDT;
   identify, by the at least one first gNB-DU and when receiving a message including a small data from the UE, the UE context of SDT via matching the UE ID of SDT in the MAC CE sent by the UE with the UE ID of SDT stored in the at least one first gNB-DU;
   identify, by the at least one first gNB-DU, a logical channel identifier (LCID) via the UE context of SDT and send the small data to the gNB-CU via a general packet radio service (GPRS) tunneling protocol (GTP) user plane (GTP-U) tunnel based on a mapping between the LCID and GTP-U transport network layer (TNL) info; and
   perform, by the gNB-CU, one or more of deciphering or integrity detection using updated security information.

6. The apparatus of claim 1, wherein the UE context of SDT comprises at least one of a F1 User plane interface (F1-U) general packet radio service (GPRS) tunneling protocol (GTP) user plane (GTP-U) tunnel transport network layer (TNL) info or a bearer configuration for SDT.

7. The apparatus of claim 1, wherein the UE context suspension indication and the UE ID of SDT are included in a F1 application protocol (F1-AP) message.

8. The apparatus of claim 1, wherein the processor is configured to cause the apparatus to:
send, by a gNB-CU control plane (gNB-CU-CP), a SDT and security information to at least one gNB-CU user plane (gNB-CU-UP).

9. The apparatus of claim 5, wherein the processor is configured to cause the apparatus to:
receive, by a second gNB-DU, a small data from the UE by a second gNB-DU;
send, the second gNB-DU, a UE context of SDT required indication to the gNB;
send, by the gNB-CU, the UE context of SDT to the second gNB-DU;
identify, by the second gNB-DU, the LCID via the UE context of SDT and sending-send the small data to the gNB-CU via a GTP-U tunnel based on a mapping between the LCID and GTP-U TNL info; and
perform, by the gNB-CU, one or more of deciphering or integrity detection using updated security information.

10. An apparatus, comprising:
a memory; and
a processor coupled to the memory, the processor configured to cause the apparatus to:
receive, by a gNB distributed unit (gNB-DU), a message including a small data, and a data volume indication (DVI) from a UE;
determine, by the gNB-DU, that the UE is not to enter an RRC_CONNECTED state according to the DVI;
send, by the gNB-DU, one or more of a UE context retrieval request message or a logical channel identifier (LCID) of small data to a gNB Central Unit (gNB-CU), and indicate that the UE is not required to enter the RRC_CONNECTED state;
provide, by the gNB-CU, a UE context of small data transmission (SDT) to the gNB-DU; and
forward, by the gNB-DU, the small data to the gNB-CU using the UE context of SDT.

11. An apparatus, comprising:
a memory; and
a processor coupled to the memory, the processor configured to cause the apparatus to:
receive, by a gNB distributed unit (gNB-DU), a message including a small data and a data volume indication (DVI) from a UE;
abstract, by the gNB-DU, the DVI and generate a DVI in F1 application protocol (F1-AP);
send, by the gNB-DU, the DVI in one or more of F1-AP or a logical channel identifier (LCID) of small data to a first gNB Central Unit (gNB-CU);
determine, by the first gNB-CU, that the UE is not to enter an RRC_CONNECTED state according to the DVI in F1-AP and provide a UE Context of small data transmission (SDT) to the gNB-DU; and
forward, by the gNB-DU, the small data to the first gNB-CU using the UE context of SDT.

12. The apparatus of claim 11, wherein to determine that the UE is not to enter an RRC_CONNECTED state according to the DVI in F1-AP and to provide the UE Context of SDT to the gNB-DU, the processor is configured to cause the apparatus to:
identify, by the first gNB-CU, a UE context of SDT.

13. The apparatus of claim 11, wherein to determine that the UE is not to enter the RRC_CONNECTED state according to the DVI in F1-AP and to provide the UE context of SDT to the gNB-DU by the first gNB-CU, the processor is configured to cause the apparatus to:
resolve, by the first gNB-CU, a second gNB-CU contained in an I-RNTI of a radio resource control (RRC) message;
provide, by the first gNB-CU, the DVI in one or more of the F1-AP or the LCID of small data to the second gNB-CU;
request, by the first gNB-CU, the second gNB-CU to provide a UE context of SDT;
identify, by the second gNB-CU, the UE context of SDT;
determine, by the second gNB-CU, that the UE is not to enter the RRC_CONNECTED state and provide the UE context of SDT to the first gNB-CU; and
forward, by the first gNB-CU, the UE context of SDT to the gNB-DU.

14. The apparatus of claim 11, wherein the processor is configured to cause the apparatus to:
start, by the gNB-DU, a timer; and
release, by the gNB-DU, the UE context of SDT when the timer expires.

15. The apparatus of claim 11, wherein the DVI comprises one or more of a data volume for SDT to be sent or a 2-bit access stratum release assistance indication.

16. The apparatus of claim 11, wherein the message including the small data and the DVI comprises one or more of a MsgA of a 2-step random access (RA) or a Msg3 of a 4-step RA.

17. The apparatus of claim 10, wherein the DVI comprises one or more of a data volume for SDT to be sent or a 2-bit access stratum release assistance indication.

18. The apparatus of claim 10, wherein the DVI comprises a medium access control (MAC) control element (CE).

19. The apparatus of claim 10, wherein the processor is configured to cause the apparatus to:
start, by the gNB-DU, a timer; and
release, in response to expiration of the timer, the UE context of SDT.

20. The apparatus of claim 10, wherein the message including the small data and the DVI comprises one or more of a MsgA of a 2-step random access (RA) or a Msg3 of a 4-step RA.

* * * * *